United States Patent [19]

Kamprath et al.

[11] Patent Number: 4,630,471
[45] Date of Patent: Dec. 23, 1986

[54] TEMPERATURE RESISTANT TIRE PRESSURE CONTROL DEVICE

[75] Inventors: Axel Kamprath, Mühlacker; Volker Ruehr, Leinfelden-Echterdingen, both of Fed. Rep. of Germany

[73] Assignee: Dr. Ing.h.c.F Porsche Aktiengesellschaft, Stuttgart, Fed. Rep. of Germany

[21] Appl. No.: 707,575

[22] Filed: Mar. 4, 1985

[30] Foreign Application Priority Data

Mar. 3, 1984 [DE] Fed. Rep. of Germany ....... 3407895

[51] Int. Cl.⁴ .................... G01L 9/00; G01M 17/02
[52] U.S. Cl. ............................. 73/146.5; 340/58
[58] Field of Search ............. 73/146.5, 146.4, 756, 73/146.2; 340/58

[56] References Cited

FOREIGN PATENT DOCUMENTS 0059795 12/1981 European Pat. Off. .
2824992 12/1979 Fed. Rep. of Germany .
1459152 12/1976 United Kingdom .
2122757 1/1984 United Kingdom ................. 340/58

Primary Examiner—Donald O. Woodiel
Attorney, Agent, or Firm—Barnes & Thornburg

[57] ABSTRACT

An apparatus for the heat-insulated placement of an electronic emitter that is a component of a tire pressure control device for a motor vehicle. The emitter is attached to the axle of the motor vehicle by a housing which contains an insulating material to form a heat shield to protect the emitter. The presence of the heat shield allows the emitter to be located in close proximity to the caliper of a disc brake system of the motor vehicle, a location which would otherwise be unavailable due to high ambient temperatures.

14 Claims, 9 Drawing Figures

TEMPERATURE RESISTANT TIRE PRESSURE CONTROL DEVICE

BACKGROUND AND SUMMARY OF THE INVENTION

This invention relates to a tire pressure control device used on a motor vehicle, and particularly to an apparatus for mounting the electronic emitter component of the tire pressure control device so that the electronic emitter is insulated from the high temperatures occurring in the mounting area.

Known devices for the control of the tire pressure of a motor vehicle include a manometric switch that is fastened to the rim of the motor vehicle and rotates with the wheel as well as an electric emitter attached to the axle which does not rotate. The emitter is disposed in the rim dish in the space between the brake disk and the base of the rim and is therefore exposed to relatively high temperatures caused by the adjacent brake disk and caliper. Temperatures of over 750° C. occur at the brake disk and because of radiative transmission of the heat, this results in temperatures at the emitter of about 250° C. During the cooling phase of the brake disk, the caliper temperature increases so that during a short period of time, the temperature of 250° C. remains constant and no significant cooling occurs. These relatively high temperatures can destroy the electronic part of the emitter or can cause an erroneous signal which leads to incorrect operation of the tire pressure control device.

The object of the present invention is to provide a tire pressure control device which is able to operate properly despite the relatively high ambient temperatures.

According to the present invention, the electronic emitter component of a tire pressure control device is mounted on the caliper portion of the brake assembly in such a manner that the emitter is insulated from the high ambient temperatures occurring in the mounting area.

The main advantages achieved by the present invention are that the heat-sensitive part of the emitter is shielded from the relatively high ambient temperatures by a housing and thus the emitter is exposed to only those temperature-caused stresses that do not have a negative effect on its operation.

By using a high-temperature-resistant and high-strength plastic, such as polyimide, which also exhibits low thermal conductivity, the design of the housing can be thin-walled. As a result, only a small space is required at the mounting site between the brake disk and the base of the rim, this space being limited since the manometric switch projects into this space and an air gap must exist between the emitter and the manometric switch.

By using a heat-insulating material on the side of the emitter facing the brake disk, a temperature of 100° C. can be maintained on the bottom side of the emitter even when the temperatures of the brake disk reach 880° C. By using a housing made of a plastic material having low thermal conductivity in combination with a material with high heat-insulating capabilities, an optimal shielding against heat is achieved which ensures high operability and a long useful life.

In order to limit the introduction of heat into the emitter to as low a level as possible, the housing is connected with a holding means attached to the axle via a clamping means which, as compared to a fixed screw-type connection, has the advantage of transmitting less heat to the emitter. In the case of conventional screw connections between the holding means and the housing, the housing would be subjected to a melting effect and thus the emitter would be subjected to higher temperatures than in the present invention.

The only screw-type connection between the holding means and the housing is arranged in a fastening part in such a way that it is sufficiently removed from the sensitive parts of the electronic emitter so that the heat transmitted by the screw does not harm the emitter. By using a detachable fastening part, it is possible to remove the housing and exchange the emitter in a simple manner. Also, by removing a cover, the encapsulated insulating material can be replaced. The cover is secured in a watertight manner preferably by the use of a silicone material to prevent the insulating material from absorbing moisture since this would considerably decrease its heat-insulating characteristics.

Further objects, features, and advantages of the present invention will become more apparent from the following description when taken with the accompanying drawings which show, for purpose of illustration only, an embodiment in accordance with the present invention.

DETAILED DESCRIPTION OF THE DRAWINGS

Figure 1:
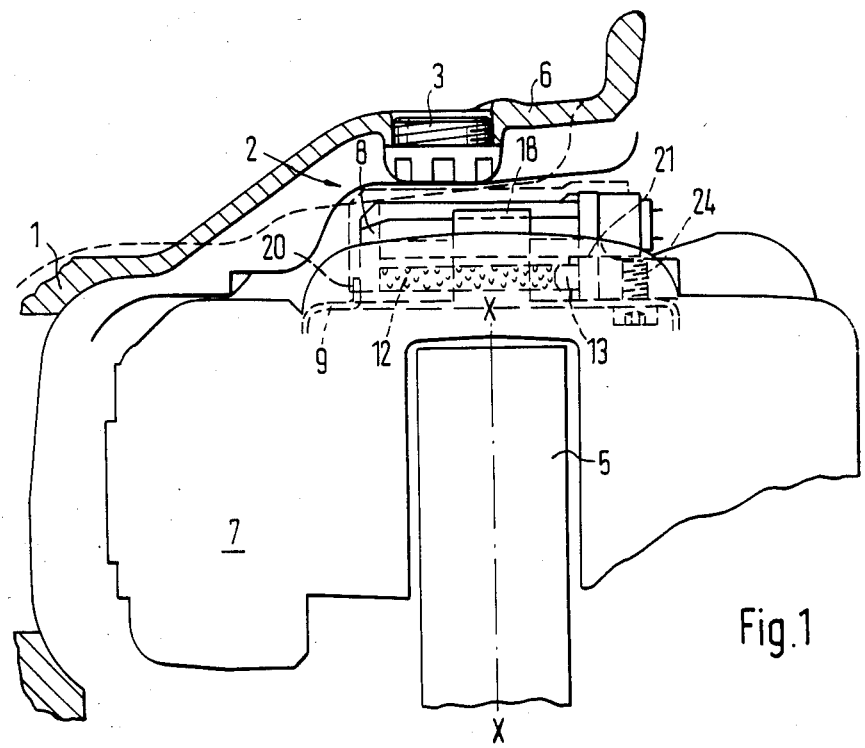
FIG. 1 is a vertical section through a rim having a tire pressure control device.
Figure 2:
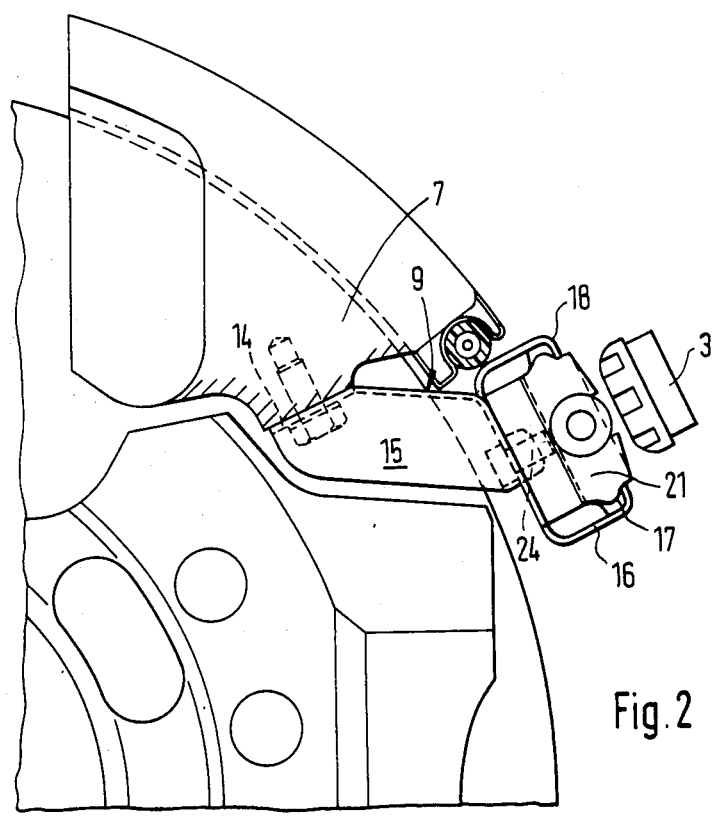
FIG. 2 is a lateral view of the rim from the inside.
Figure 3:
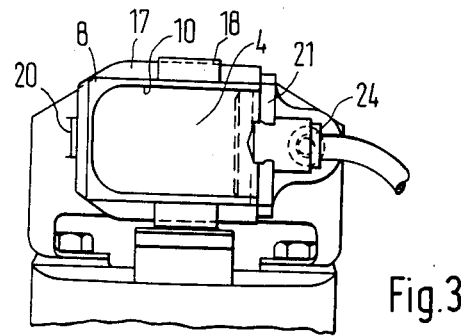
FIG. 3 is a top view of the housing connected with the caliper.
Figure 4:
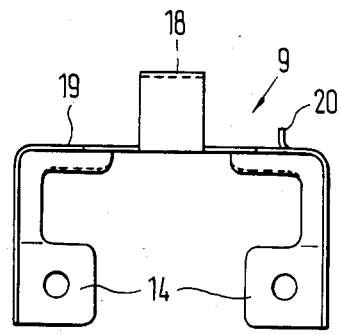
FIG. 4 is a front view of the holding means for the housing.
Figure 5:
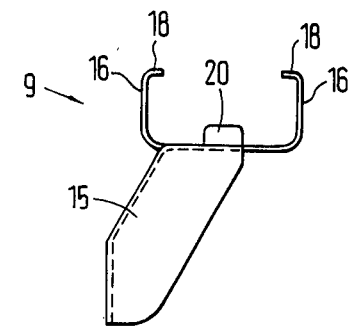
FIG. 5 is a lateral view of the holding means.
Figure 6:
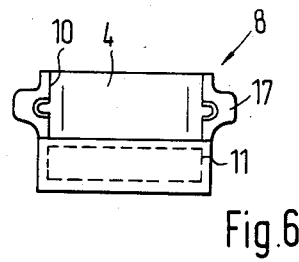
FIG. 6 is a front view of the housing with the chamber.
Figure 7:
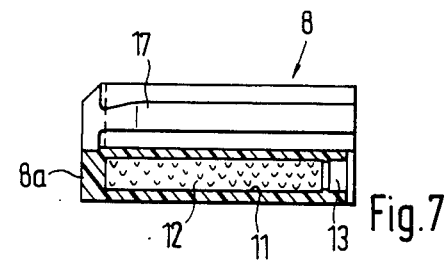
FIG. 7 is a cross-section through the housing.

A tire pressure control device 2 is arranged within a rim 1 of a wheel. It essentially comprises a manometric switch 3 connected with the rim 1, said manometric switch 3 interacting with an electronic emitter 4. This emitter 4 is attached to the axle at a distance from the manometric switch 3, for example, on the caliper 7, and interacts with an electronic evaluating system.

The device 2 is arranged in the space above a brake disk 5 and in the base 6 of the rim approximately in the area of the vertical center plane X—X of the brake disk 5.

The emitter 4 is embedded in a housing 8 and is held in an operating position with respect to the manometric switch 3 by a holding means 9 connected with the caliper 7.

For the inserting of the emitter 4, the housing 8 has a boat-shaped receiving means 10, and in the bottom 8a of the housing 8, a chamber 11 is provided. A heat-insulating material 12 is provided in this chamber 11 to form a heat shield for the emitter 4. The chamber 11 is closed via a cover 13 which is glued in a watertight manner. A high-temperature-resistant, vacuum-deformable ceramic fiber mat on a silicon dioxide and aluminum dioxide base having a maximum thermal conductivity of 0.05 W/m·K is preferably used as the heat-insulating material 12. This insulating material 12 provides that the emitter 4 is exposed to temperatures not greater than 110° C., and thus the emitter 4 is able to operate in a precise manner.

Figure 8:
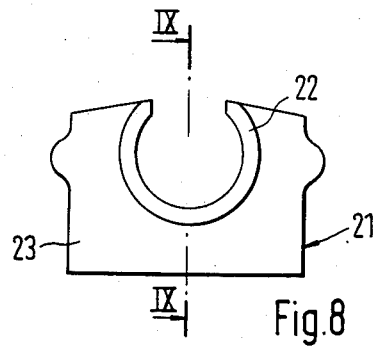
FIG. 8 is a front view through a fastening part.
Figure 9:
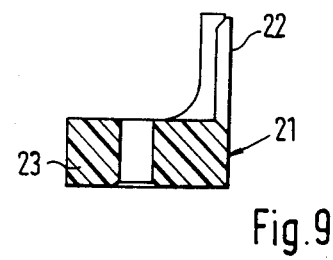
FIG. 9 is a section according to Line IX—IX of FIG. 8.

The housing 8 is connected with the caliper 7 via the holding means 9. The holding means 9 has brackets 14, an arm 15, and tension arms 16 connected to it. Together, these form a U-shaped receptacle to receive the housing 8 by clamping housing 8 between them. The housing 8 has lateral side-in webs 17 which are arranged so that they protrude and extend longitudinally. The lateral slide-in webs 17 are overlapped by bent parts 18 of the tension arms 16 to press the housing 8 onto the base plate 19 of the holding means 9. On the base plate 19, the housing 8 is held between a stop 20 on the side of the holding means 9 and a fastening part 21 on the side of the housing 8 (FIGS. 8 and 9). This part 21 is angular and has a vertical receiving part 22 for supporting the emitter 4 and a horizontal fastening plate 23 which is fixed to the holding means 9 via a screw 24. The screw 24 is arranged in such a way that it is as far as possible from the main source of heat so that heat transmission to the emitter 4 via the screwed connection is avoided. For this purpose, the tension arms 16 are in contact with the housing 8 only in the area of the slide-in web 17. Apart from that, the side faces of the housing 8 are exposed. In the same way, the bottom 8a of the housing 8 may also rest on the base plate 19 of the holding means 9 via a few raised points.

Since the space available for the arrangement of the emitter 4 is very limited, a housing 8 is needed that requires little space and can, on the one hand, meet the requirements in regard to strength and, on the other hand, receive the inserts required for the shielding against heat. For this purpose, the housing 8 is preferably made of a high-temperature-resistant, fiber-glass-reinforced, plastic material, such as polyimide, or of a thermoplastic fluoropolymer.

The housing 8 is exchangeably arranged in the holding means 9 such that when the fastening screw 24 in part 21 is loosened, the housing 8 may be pulled out between the tension arms 16 in the direction of the inside of the rim. The emitter 4 that is held in the boat-shaped receiving means 10 can therefore be removed and in the case of a defect can, in a simple manner, be replaced by a new emitter. For the installation of the housing 8, this housing 8 is pushed between the tension arms 16, in which case a guiding takes place via the slide-in webs 17. The front fastening part 21 fixes the housing in its position and at the same time, holds the cover 13 of the chamber 11 for the heat-insulating material 12.

Although the invention has been described in detail with reference to a preferred embodiment and specific examples, variations and modifications exist within the scope and spirit of the invention as described and defined in the following claims.

What is claimed is:

1. An apparatus for the heat-insulated placement of an electronic emitter which is part of a tire pressure control device which is situated adjacent to a wheel rim on a caliper of a brake disk arrangement of a motor vehicle, the tire pressure control device having a rotating manometric switch attached to a side of said wheel rim, said switch interacting with said emitter so that impulses are generated in said emitter, the apparatus comprising, a housing for mounting the emitter to the caliper, said housing having receiving means for holding the emitter and a bottom portion containing insulating material for thermally isolating the emitter from heat generated in the area of the caliper.

2. The apparatus of claim 1, wherein the bottom of the housing is formed to include a chamber to receive the insulating material and wherein a cover is provided to seal the chamber in a watertight manner.

3. The apparatus of claim 2, further comprising a holding means attached to a caliper of the motor vehicle, the holding means having two angular tension arms and a base plate for slidably receiving the housing.

4. The apparatus of claim 3, wherein the housing has protruding lateral slide-in webs which extend longitudinally, and wherein the tension arms have bent parts for holding the housing on the base plate.

5. The apparatus of claim 4, wherein the holding means includes a stop and a detachable fastening part for holding the housing on the base plate, the fastening part being formed to partially hold the emitter and fastened to the holding means by a screw which is located away from the electronic core of emitter.

6. The apparatus of claim 5, wherein the fastening part holds the cover of the chamber in a closed position.

7. The apparatus of claim 1, wherein the insulating material consists of a high-temperature-resistant ceramic fiber mat on a silicone dioxide and aluminum dioxide base with an inorganic binder and has a maximum thermal conductivity of 0.05 W/m·K.

8. The apparatus of claim 1, wherein the insulating material forms a heat shield to shield emitter in the housing from temperatures greater than 110° C.

9. The apparatus of claim 1, wherein the housing is formed from a material consisting of a high-temperature-resistant, fiber-glass reinforced plastic material.

10. The apparatus of claim 9, wherein the housing is formed from a material consisting of polyimide.

11. The apparatus of claim 1, wherein the housing is formed from a material consisting of a thermoplastic fluoropolymer.

12. In a motor vehicle having a wheel including a rim mounted for rotation on an axle with a brake disk, a caliper mounted with respect to the axle to interact with the brake disk, and a tire pressure control device comprising a manometric switch attached to the rim for rotation therewith and an electronic emitter situated on the caliper to interact with the manometric switch, the improvement comprising a housing for mounting the emitter to the caliper having a boat-shaped receiving means for holding the emitter and a bottom portion containing an insulating material to form a heat shield to protect the emitter.

13. The apparatus of claim 12, further comprising a holding means attached to the caliper, the holding means including two angular tension arms and a base plate for receiving the housing.

14. An apparatus for the heat-insulated placement of an electronic emitter which is part of a tire pressure control device and which is attached adjacent to a wheel rim to a stationary member of a motor vehicle, said device having a rotating manometric switch attached to a side of said wheel rim, said switch interacting with said emitter so that impulses are generated in the emitter, the apparatus comprising a housing having receiving means for holding the emitter, a bottom portion of said housing containing insulating material and holding means for attaching the housing to the stationary member, wherein the apparatus serves to substantially thermally isolate the emitter.

* * * * *